ps Patent Office 3,558,179
Patented Jan. 26, 1971

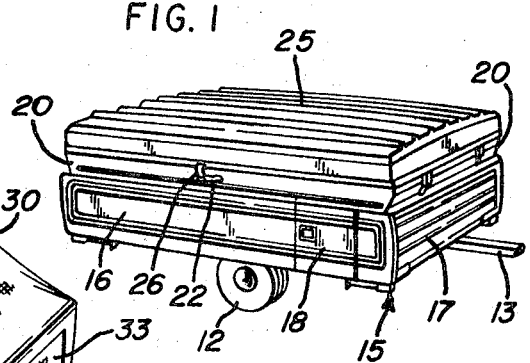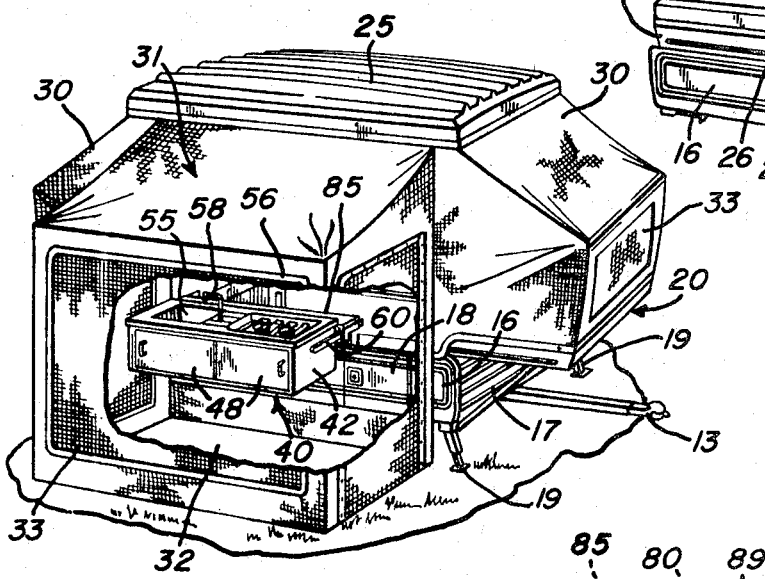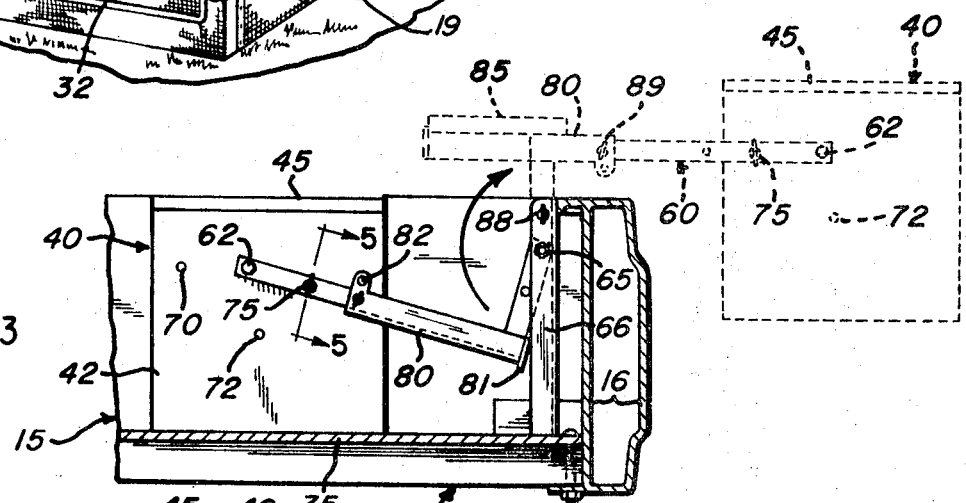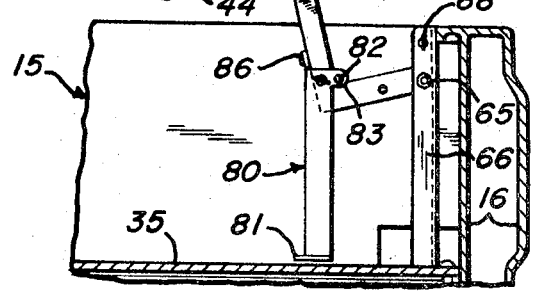

3,558,179
CAMPING VEHICLE WITH RETRACTABLE CONSOLE
Raymond Ernest Sonet, Brussels, Belgium, assignor to Ward Manufacturing, Inc., Hamilton, Ohio, a corporation of Ohio
Filed Sept. 17, 1968, Ser. No. 760,199
Int. Cl. B60p *3/34*
U.S. Cl. 296—23          8 Claims

ABSTRACT OF THE DISCLOSURE

A camping trailer including a body which supports a set of extendable beds and a cover movable between collapsed and elevated positions, is equipped with a utility console supported by a set of pivotable arms for movement between a retracted position within the body and a position spaced outwardly from the body through an intermediate elevated position within the body.

BACKGROUND OF THE INVENTION

The field of this invention involves camping trailers of the type commonly employing a two-wheeled chassis supporting a generally box-like body. A pair of beds are mounted on the body for movement between retracted or collapsed positions for storing and towing the trailer and extended positions for providing an enclosed temporary living and sleeping area. Commonly, each bed is either hinged to the body and opens outwardly to rest on supporting braces or is slidably supported for movement horizontally between a retracted position over the body and an extended position projecting outwardly from the body.

The trailer commonly includes a cover which may comprise a substantially rigid rectangular top serving as a hard top for the trailer when the beds are retracted, and which is connected to the beds by U-shaped bows so that when the beds are extended, the top is simultaneously and automatically elevated or raised. The hard top is connected to the beds and body by a flexible material such as canvas which is extended over each bed by a bow to provide covered space above the beds. The cover may also be formed entirely of canvas and be erected either after or while the beds are extended by uprighting retractable bows.

Such a camping trailer is frequently provided with a utility console as, for example, one which provides a usable work surface and a storage shelf and incorporates a sink and a gas stove which are recessed within the work surface. The consoles are usually constructed and supported so that they may be lifted from a stored position adjacent the floor for collapsing the beds and cover to an elevated position within the body where the work surface, stove and sink are at a convenient level for use by a person standing on the floor.

Sometimes a canvas tent or roof is erected on the ground adjacent the side wall of the trailer body containing the door to provide an additional covered room or area. When a set of table and chairs are set up in this area to use it as a dining area, it is desirable to have the utility console located in this area to avoid climbing in and out of the trailer body during preparation of a meal and during clean up after the meal.

SUMMARY OF THE INVENTION

The present invention is directed to a camping trailer as described above and which incorporates an improved support for a utility console whereby the console can be easily moved between a retracted or stored position adjacent the floor of the body to an elevated position within the body for convenient use by a person standing on the floor of the body or to an extended position located outwardly from a side wall of the body at an elevation where the console can be conveniently used by a person standing on the ground within the additional covered area.

In accordance with one embodiment of the invention, the utility console comprises an elongated cabinet which includes a countertop providing a work surface. A sink and a stove are recessed within the top, and sliding doors are mounted on each side of the cabinet for access to a shelf extending the full length of the cabinet below the countertop. The console is pivotally supported at each end by an L-shaped arm which is pivotally connected to a side wall of the body in such manner that the console may be moved from its elevated position within the body over the side wall to a lower position spaced outwardly from the side wall. Quick release pins are employed to secure each arm to the cabinet after it is moved to its elevated or extended position to prevent tilting of the cabinet, and brace members are slidably mounted on the arms to secure the arms for supporting the console in its elevated position.

BRIEF DESCRIPTION OF THE DRAWING

FIG. 1 is a perspective view of a camping trailer constructed in accordance with the invention and illustrating the trailer when it is collapsed;

FIG. 2 is a perspective view of the trailer shown in FIG. 1 when it is extended or set up and showing the utility console in its extended position outside the trailer;

FIG. 3 is a fragmentary and somewhat schematic section through the extended trailer of FIG. 2 and showing the console in its retracted and extended positions;

FIG. 4 is a fragmentary section similar to FIG. 3 and showing the console in its elevated position within the trailer; and FIG. 5 is a fragmentary section taken generally on the line 5—5 of FIG. 3.

DESCRIPTION OF A PREFERRED EMBODIMENT

The camping trailer shown in the drawing includes a chassis comprising a frame 10 (FIG. 3) supported by a pair of wheels 12 and having an extending tow bar 13 adapted to be attached to a hitch mounted on a towing vehicle. A generally rectangular body 15 having side walls 16 (FIG. 3) and end walls 17 is mounted on the frame 10, and the left side wall is provided with a hinged door 18 (FIGS. 1 and 2). Retractable jacks 19 are mounted on the lower corners of the body 15 and are adapted to be lowered and extended (FIG. 2) for stabilizing the body after the trailer is parked at a camping site.

A pair of beds 20 are slidably mounted on the body 15 and are movable horizontally between retracted positions (FIG. 1) and extended positions (FIG. 2) wherein the beds are provided with braces 21. The beds 20 are fastened together in retracted position by a pair of toggle clamps 22 located on opposite sides of the trailer.

A top 25 having a rectangular configuration substantially the same as the body 15 and preferably formed from rigid plastic extends over the beds 20 when they are retracted as shown in FIG. 1. The top 25 is secured to the retracted beds 20 by a series of toggle clamps 26 having a construction similar to the clamps 22. When the clamps 22 and 26 are released and the beds are moved towards their extended positions, the top 25 is elevated automatically by a pair of U-shaped bows (not shown) which are mounted on opposite ends of the top and are pivotally connected to the inner corners of the beds in a manner such as shown in copending application Ser. No. 537,504, filed Mar. 25, 1966 and assigned to the assignee of the present invention.

Canvas extends from the outer periphery of the top 25 to the body 15 and beds 20 and is supported outwardly over the beds by U-shaped bows (not shown) to form corresponding tent portions 30. Canvas is also supported outwardly between the left side wall 16 of the body and the top 25 to form a tent portion 31 defining an enclosed room of space 32 and preferably having a canvas floor which rests on the ground. Windows 33 are formed within the tent portions 30 and 31 and are covered by a fabric netting. Referring to FIGS. 3 and 4, the trailer body 15 is provided with a floor 35 which is rigidly secured to the frame 11.

An elongated utility console 50 having a rectangular configuration is positioned on the floor 35 (FIG. 3) adjacent the right inner side wall 16 of the body. The console includes a wooden cabinet having end walls 42 connected by a base wall or shelf 44 and a top 45 which provides an upper work surface 46. A pair of sliding doors 48 are supported on each side of the console 40 within tracks 49 formed within the shelf 44 and top 45 and provide access from either side of the cabinet to the inside of the cabinet and the articles supported by the shelf 44.

Referring to FIG. 2, a sink 55 and a gas stove 56 are recessed within the top 45 of the console 40, and a spout 58 projects upwardly and outwardly over the sink 55 for supplying water from a suitable storage container (not shown). An L-shaped tubular arm 60 having a rectangular cross-section is pivotally connected to each end wall 42 of the console 40 by a pivot bolt 62 which projects through one end of the arm. The opposite end of each arm 60 is pivotally connected by a bolt 65 to a vertical channel member 66 rigidly secured to the right side wall 16 of the body 15.

A pair of tubular bushings 70 and 72 are mounted on each end wall 42 of the console 40, and each bushing 70 is adapted to receive a quick release pin 75 (FIG. 5) projecting through laterally aligned holes formed within the arm 60. Preferably, each pin 75 includes a winged head 76 and a pair of opposite recesses 77 within its pointed tip for receiving a spring clip 78 mounted on the inner surface of the corresponding end wall 42. Each pin 75 is released by turning it 90° and retracting it from the bushing 70 or 72.

A channel-like brace member 80 is slidably mounted on each arm 60 and has a flat foot plate 81 on one end. A tubular stud 82 (FIG. 5) is supported by ears 83 formed on the opposite end of each brace member 80 and engages one edge of the corresponding arm 60 to retain the brace member 80 on the arm 60. A detachable seat 85 (FIG. 3) is mounted on the brace members 80 and extends parallel with the console 40.

As illustrated in FIGS. 3 and 4, the console 40 is movable from a retracted position (FIG. 3) where the shelf 44 rests upon the floor 35 to an elevated position (FIG. 4) within the body 15. To secure the console in the elevated position (FIG. 4), each brace member 80 is lowered and moved to a vertical position where the foot plate 81 rests upon the floor 35 and the upper end of the brace member engages a washer 86 (FIG. 4) secured by a rivet to the corresponding arm 60. When the console 40 is in its elevated position, the top 45 is located at an elevation for convenient use by a person standing on the floor 35. The console 40 is prevented from rocking on the pivot bolts 62 in its elevated position by engagement of the quick release lock pins 75 within the bushing 72.

When it is desired to have the console 40 located within the space 32 defined by the tent portion 31, the lock pins 75 are released, and the arms 60 are pivoted clockwise (FIG. 4) until the console 40 arrives in an extended position (FIGS. 2 and 3) spaced outwardly from the right side wall 16 of the body 15. When the console 40 is in this extended position, the lock pin 75 at each end of the console is engaged with the corresponding bushing 70 to prevent tilting or rocking of the console 40 relative to the arms 60.

A quick release lock pin 88, substantially identical to the pin 75, extends through aligned holes formed within each arm 60 and its corresponding support channel 66 to prevent rotation of the arms 60 relative to the support channels 66. Also when the console 40 is in its extended position, the shelf 44 is located substantially below the upper surface of the adjacent side wall 16, and the removable seat 85 is supported by the brace members 80 at a suitable elevation from the floor 35 to provide an additional bench or seat within the body 15. A quick release lock pin 89 (FIG. 3) secures each brace member 80 to its corresponding arm 60 when the seat 85 is mounted on the brace members 80.

From the drawing and the above description, it is apparent that a utility console constructed in accordance with the invention provides desirable features and advantages. For example, by supporting the console 40 with the pair of L-shaped arms 60 which are pivotally connected to the upper portions of the support channels 66 and are movable through angles greater than 90°, the utility console can be easily moved from a retracted position adjacent the floor 35 of the body 15 to an extended position spaced outwardly from the body 15 where the console may be conveniently used by a person standing on the ground within the room 32. While no counterbalancing means are provided for the utility console 40, it is to be understood that each arm 60 may be pivotally connected to its corresponding support channel 66 by the use of one or more torsion coil springs as disclosed in copending application Ser. No. 642,958, filed June 1, 1967 and assigned to the assignee of this application.

Another important advantage of the invention is that the arms 60 and brace members 80 also provide for supporting the utility console 40 in an elevated position within the body 15 so that it may be conveniently used in camping set ups where an additional room extending outwardly from the trailer is not employed. Furthermore, with sliding doors 48 on each side of the utility console 40, convenient access to the shelf 44 is provided regardless of whether the console is supported in its elevated position (FIG. 4) or its extended position (FIG. 2). Moreover, the brace members 80 cooperate not only to support the console in its elevated position but also cooperate to provide a support for the seat 85 within the trailer body 15 when the console is moved to its extended position.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A wheel-supported camping vehicle comprising a box-like body including a floor bounded by side and end walls, a cover for said body and movable between collapsed and elevated positions in relation to said body, a utility console having an upper work surface and a lower base surface, a plurality of support arms for said console, pivot means connecting said arms to said console and to said body, said console being movable between a retracted position within said body with said base surface located adjacent said floor and an extended position where the entire said console is located horizontally outboard of one of said walls of said body, and said arms include portions projecting cantileveredly from said one wall for supporting the entire said console in said extended position.

2. A camping vehicle as defined in claim 1 wherein each said arm has a generally L-shaped configuration and has one end portion pivotally connected to said one wall and another end portion pivotally connected to said console.

3. A camping vehicle as defined in claim 1 including extendable brace members mounted on said arms for supporting said console at an intermediate elevated position within said body with said base surface of said console spaced substantially above said floor for convenient use of said console by a person standing on said floor.

4. A camping vehicle as defined in claim 1 wherein said base surface of said console is disposed substantially below the upper surface of said one wall when said console is located in said extended position.

5. A camping vehicle as defined in claim 1 including quick release means connecting at least one of said arms to said console when in said extended position to prevent rotation of said console relative to said arm for retaining said work surface in a horizontal plane.

6. A camping vehicle as defined in claim 3 including a seat member mounted on said brace members and arranged to provide a seat within said body when said console is located in said extended position.

7. A camping vehicle as defined in claim 3 comprising a channel-shaped said brace member slidably mounted on each said arm, pin means for retaining each brace member on the corresponding said arm, and means for locking each brace member in an extended position engaging said floor for supporting said console in said intermediate elevated position.

8. A wheel-supported camping vehicle comprising a box-like body including a floor bounded by side and end walls, a cover for said body and movable between collapsed and elevated positions in relation to said body, a utility console having an upper work surface and a lower base surface and including front and rear walls and a shelf positioned below said upper work surface, a plurality of support arms, pivot means connecting said arms to said console and to said body, said arms and said pivot means being arranged to effect movement of said console between a retracted position within said body with said base surface located adjacent said floor and an extended position where the entire said console is disposed outboard of said body to provide convenient use of said console by a person standing on the ground in the area adjacent said body, means cooperating with said arms for supporting said console at an intermediate elevated position within said body with said base surface of said console spaced substantially above said floor for convenient use of said console by a person standing on said floor, and means forming a door in each said wall of said console to provide for convenient access to said shelf while said console is located in either said elevated position or said extended position.

References Cited
UNITED STATES PATENTS

| | | | |
|---|---|---|---|
| 3,347,591 | 10/1967 | Soroos | 296—23 |
| 3,456,979 | 7/1969 | Hunter | 296—23 |
| 3,406,999 | 10/1968 | Kozicki | 296—23 |

PHILIP GOODMAN, Primary Examiner

U.S. Cl. X.R.

296—27